United States Patent [19]
Smith et al.

[11] Patent Number: 6,116,027
[45] Date of Patent: Sep. 12, 2000

[54] SUPPLEMENTAL AIR SUPPLY FOR AN AIR SEPARATION SYSTEM

[75] Inventors: Arthur Ramsden Smith, Telford; Donald Winston Woodward, New Tripoli; William Curtis Kottke, Fogelsville, all of Pa.

[73] Assignee: Air Products And Chemicals, Inc., Allentown, Pa.

[21] Appl. No.: 09/162,948

[22] Filed: Sep. 29, 1998

[51] Int. Cl.[7] .................................................. F01K 17/00
[52] U.S. Cl. ................................................ 60/648; 60/649
[58] Field of Search ............................ 60/645, 648, 649, 60/39.02

[56] References Cited

U.S. PATENT DOCUMENTS

| | | | |
|---|---|---|---|
| 3,950,957 | 4/1976 | Zakon | 60/648 X |
| 4,545,787 | 10/1985 | Hegarty | 55/16 |
| 4,712,610 | 12/1987 | Kesten et al. | 60/649 X |
| 4,812,610 | 3/1989 | Parker et al. | 60/649 X |
| 5,035,727 | 7/1991 | Chen | 55/16 |
| 5,040,370 | 8/1991 | Rathbone | 60/648 |
| 5,081,845 | 1/1992 | Allam et al. | 62/24 |
| 5,146,756 | 9/1992 | Lavin | 62/24 |
| 5,222,365 | 6/1993 | Nenov | 62/39 |
| 5,251,450 | 10/1993 | Agrawal et al. | 62/25 |
| 5,251,451 | 10/1993 | Xu et al. | 62/25 |
| 5,256,172 | 10/1993 | Keefer | 423/230 |
| 5,257,504 | 11/1993 | Agrawal et al. | 62/24 |
| 5,388,395 | 2/1995 | Scharpf et al. | 60/39.02 |
| 5,402,631 | 4/1995 | Wulf | 60/39.02 |
| 5,406,786 | 4/1995 | Scharpf et al. | 60/39.05 |
| 5,421,166 | 6/1995 | Allam et al. | 62/24 |
| 5,485,719 | 1/1996 | Wulf | 60/39.07 |
| 5,516,359 | 5/1996 | Kang et al. | 95/14 |
| 5,560,223 | 10/1996 | Le Bihan | 62/649 |
| 5,562,754 | 10/1996 | Kang et al. | 95/54 |
| 5,565,017 | 10/1996 | Kang et al. | 95/14 |
| 5,635,541 | 6/1997 | Smith et al. | 518/703 |
| 5,657,624 | 8/1997 | Kang et al. | 60/39.02 |
| 5,666,823 | 9/1997 | Smith et al. | 62/646 |
| 5,740,673 | 4/1998 | Smith et al. | 60/39.02 |
| 5,753,007 | 5/1998 | Russek et al. | 95/41 |

FOREIGN PATENT DOCUMENTS

| | | |
|---|---|---|
| 261114 | 5/1989 | Czechoslovakia . |
| 261791 | 6/1989 | Czechoslovakia . |
| 0672877 | 9/1995 | European Pat. Off. . |
| 2686405 | 7/1993 | France . |
| 1455960 | 11/1976 | United Kingdom . |

OTHER PUBLICATIONS

A. R. Smith et al., "Improved IGCC Power Output and Economics Incorporating a Supplementary Gas Turbine", Presented at the 13th EPRI Conference on Gasification Power Plants, San Francisco, Oct. 19–21, 1994.

R. L. Bannister et al., "Integrated Gasification Combined Cycle Performance Testing", PWR–vol. 32, Proceedings of the joint Power Generation Conference, Book No. G01073, 1997.

A. R. Smith et al., "Air Separation Unit Integration for Alternative Fuels Projects", Presented at the International Gas Turbine and Aeroengine Congress and Exposition, Stockholm, Jun. 2–5, 1998.

SN 09/132930, Woodward et al, Filing Date Aug. 13, 1998.

Primary Examiner—Hoang Nguyen
Attorney, Agent, or Firm—John M. Fernbacher

[57] ABSTRACT

Pressurized byproduct gas from an air separation system is work expanded and the resulting work is used to compress supplemental feed air which is combined with a main feed air stream to supply a total air feed to the air separation system. Supplemental air can be provided only during off-design operation when the main feed air stream is insufficient to provide the total air feed to the system. Alternatively, supplemental air can be used continuously in combination with a reduced main feed air stream to provide total feed air to the system.

21 Claims, 4 Drawing Sheets

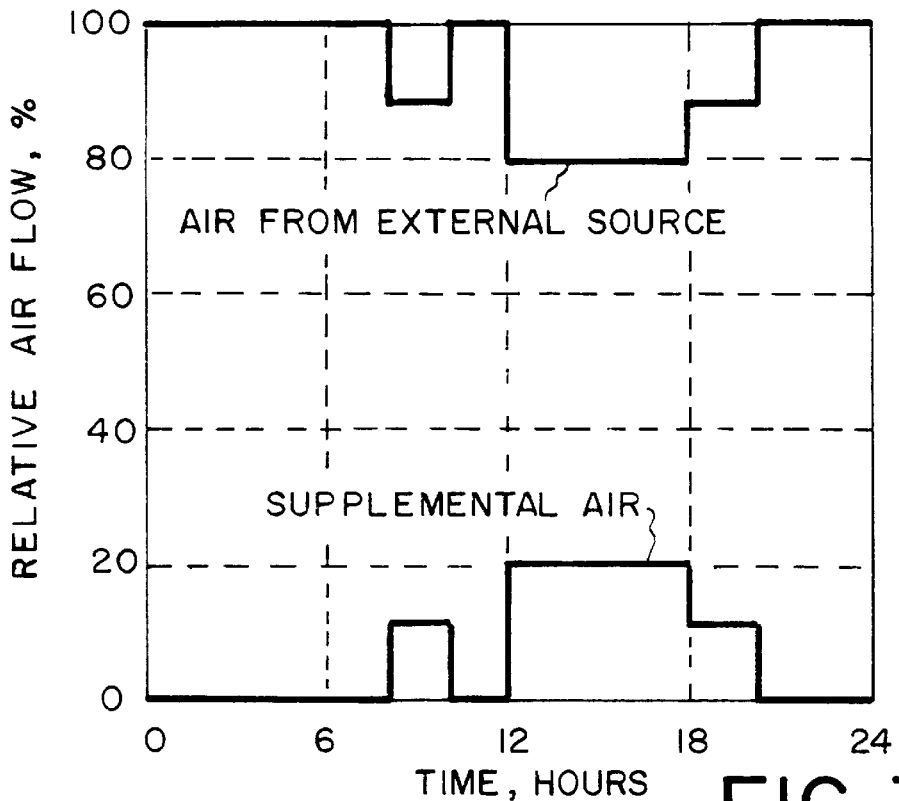
FIG. 7
FIG. 8
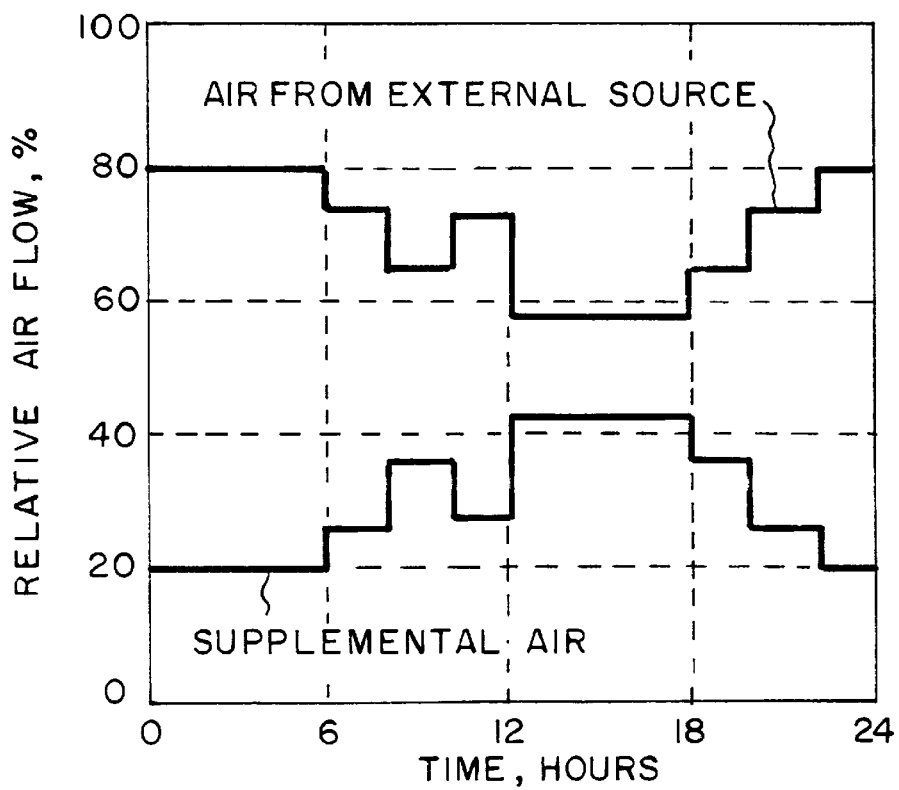

SUPPLEMENTAL AIR SUPPLY FOR AN AIR SEPARATION SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Air feed compression is one of the more costly components of air separation. Air compression is required in all practical methods of separating air into its constituents to yield useful product streams containing oxygen, nitrogen, or argon. Examples of air separation processes requiring pressurized air feed include pressure swing adsorption, chemical absorption, cryogenic distillation, permeation by polymeric membranes, and diffusion through solid ceramic ion transport membranes. Each of these processes are carried out in a system generically known as an air separation unit or ASU.

Minimizing capital costs and maximizing operating efficiency in air compression usually require the use of constant speed, motor-driven axial or centrifugal air compressors. An important operating characteristic of these compressors is that the mass flow of air which can be compressed varies significantly when parameters such as suction air temperature, suction air pressure, air humidity, and intercooler heat sink temperature change over diurnal or seasonal time periods. As air density decreases due to an environmental change such as increased ambient air temperature, the mass flow discharged from the compressor decreases. The decrease may be caused by a flow limit imposed by the essentially constant inlet volume capacity of the compressor as required for peak thermodynamic efficiency, or by a power limit of the motor-driver resulting from the increased power required for compression as air or intercooler heat sink temperatures increase. Control equipment such as inlet guide vanes can be used to increase motor-compressor operating flow ranges. Variable speed motor systems or transmissions can be employed to increase the speed of the compressor to increase volumetric capacity as ambient temperature rises; however, the loss of power transmission efficiency and the high cost of variable speed equipment usually precludes the use of these systems.

An air separation process yields at least two product streams—one enriched in a given air constituent and another depleted in that constituent. In the commercial operation of air separation processes, the stream enriched in a desired constituent is a primary product which is utilized in separate consuming process. The stream depleted in the desired constituent typically is considered a secondary product or byproduct which has less value or no value relative to the process which utilizes the primary product. For example, an air separation process can be designed and operated to produce a primary product containing 99 mole % oxygen and a byproduct containing up to 6 mole % oxygen. Conversely, a process designed and operated to yield a primary product containing 99.5 mole % nitrogen can yield a byproduct containing greater than 50 mole % oxygen. Since air separation processes are operated at pressures above atmospheric utilizing a compressed air feed, the byproduct stream often is available at a pressure above atmospheric.

The cost-effective recovery of a primary air separation product in an air separation process can be improved by utilization of the byproduct stream or streams. A byproduct stream can be used for its compositional properties, for example as an oxidant when it is rich in oxygen or a relatively inert diluent when it is rich in nitrogen. Additionally, independent of its composition, the byproduct stream can be work expanded to drive other process machinery and/or to produce refrigeration.

The largest total tonnage of atmospheric gases is produced by the cryogenic separation of air using well-known process cycles. In many cryogenic air separation systems, oxygen is recovered as the primary product and a nitrogen-rich stream is withdrawn as a byproduct. In the separation of air for integrated gasification combined cycle (IGCC) power generation systems, oxygen is the main product and is used for fuel gas production, while nitrogen is a byproduct which is introduced into the gas turbine combustor for energy recovery and combustion moderation. This application is described in the review papers entitled "Improved IGCC Power Output and Economics Incorporating a Supplementary Gas Turbine" by A. R. Smith et al presented at the 13$^{th}$ EPRI Conference on Gasification Power Plants, Oct. 19–21, 1994, San Francisco, and "Integrated Gasification Combined Cycle Performance Testing" by R. L. Bannister et al in PWR-Vol. 32, Proceedings of the Joint Power Generation Conference, Book No. G01073, 1997.

The production of oxygen by air separation for synthesis gas generation in alternate fuels production also yields a byproduct nitrogen stream which can be used in a gas turbine combustor for combustion moderation, expanded to generate work and/or refrigeration, or heated and used for steam production. These applications are described in a paper entitled "Air Separation Unit Integration for Alternative Fuels Projects" by A. R. Smith et al presented at the International Gas Turbine and Aeroengine Congress and Exposition, Stockholm, Jun. 2–5, 1998. Other representative applications for the use of byproduct nitrogen in gas turbines are described in U.S. Pat. Nos. 5,081,845; 5,421,166; 5,251,450; 5,251,541; 5,257,504; and 5,666,823.

Byproduct nitrogen from cryogenic air separation plants also can be used for applications other than combustion moderation. U.S. Pat. No. 5,635,541 discloses the expansion of byproduct nitrogen in an expansion turbine to generate electricity or to produce chilled water for process use. U.S. Pat. No. 5,388,395 also describes the use of byproduct nitrogen in an expansion turbine to generate electricity wherein the reduced-pressure cooled nitrogen is used to cool the gas turbine compressor inlet air. In U.S. Pat. No. 5,406,786, byproduct nitrogen is compressed and used for gas turbine blade cooling and for moderating combustion in the gas turbine combustor. Great Britain Patent Specification 1 455 960 discloses the work expansion of a heated nitrogen byproduct stream to provide some or all of the work to drive a two-stage ASU feed air compressor. Work expansion of a byproduct nitrogen stream to drive one stage of a multiple-stage ASU feed air compressor is described in Czech Patent No. 261114, U.S. Pat. No. 5,560,223, and French Patent Publication 2 686 405.

U.S. Pat. No. 5,040,370 discloses an air separation-chemical process plant integration in which heat from an oxygen-based reaction in the process plant is used to heat the nitrogen byproduct from the ASU, and the heated nitrogen is expanded to produce useful external work. A nitrogen byproduct is work-expanded to produce refrigeration for use within the air separation plant, and the expanded stream is further used for external ambient cooling as described in U.S. Pat. No. 5,146,756. The expansion of byproduct nitrogen optionally drives a nitrogen product compressor.

U.S. Pat. No. 5,740,673 describes an integrated gasification combined cycle power generation system in which air is supplied to the air separation plant in part from the gas turbine air compressor and in part by an independent air compressor. During periods of off-design operation when the gas turbine air compressor cannot supply sufficient compressed air to the air separation plant, supplemental air is provided by the independent air compressor.

A method to supply compressed air to a process plant is described in U.S. Pat. Nos. 5,402,631 and 5,485,719 in which a gas turbine, air compressors, and optionally gas expanders are integrated in an integral-gear gas processing system.

Air can be separated at high temperature using ceramic ion transport membranes in which oxygen is extracted from hot compressed air by permeation through the membrane to produce high-purity oxygen and a hot oxygen-depleted or nitrogen-enriched byproduct stream. This byproduct stream is expanded in a gas turbine after optional additional heating to provide work for air compression and optionally to generate electric power as described in U.S. Pat. Nos. 4,545,787; 5,035,727; 5,516,359; 5,657,624; 5,562,754; and 5,565,017. Alternatively, the byproduct stream can be cooled and used to generate work at lower temperatures as described in U.S. Pat. No. 5,753,007.

U.S. Pat. No. 5,256,172 describes a pressure swing adsorption system in which pressurized intermediate products or byproducts are work-expanded to provide a portion of the work required for feed gas compression.

Because air feed compression is one of the largest components of the total cost of air separation, there is a strong incentive to reduce both the capital and operating costs associated with this process step. The potential for capital cost reduction is especially significant for large air separation plants. The design of an air compression system for an air separation plant is complex because the design must address changes in ambient air temperature, pressure, and humidity which reduce the capacity or efficiency of air compression equipment. In addition, the design often must account for fluctuating product demand which may occur independently of, or simultaneously with, changes in ambient air conditions. An air separation process usually operates at varying ambient air conditions. The process generates one or more byproduct streams which are not of primary commercial value, and it is desirable to utilize these streams in some manner to improve the operation and reduce the cost of air separation, particularly the cost of compression.

The present invention addresses these needs by providing means to increase the overall specific power efficiency of feed air compression, supply the necessary volume of product under variable operating conditions, and utilize byproduct streams in an effective manner to achieve these objectives. The invention is described in detail below and is defined by the claims which follow.

BRIEF SUMMARY OF THE INVENTION

The invention is a method for the separation of air which comprises providing a compressed air feed stream and separating the compressed air feed stream in an air separation system to yield at least one product stream enriched in a constituent of air and at least one byproduct stream depleted in that constituent. The air separation system is operated during a given time period such that at least a portion of the compressed air feed stream is provided by a main compressed air stream. During at least part of this time period, additional air is compressed to yield a supplemental compressed air stream which provides a portion of the compressed air feed stream, and at least a portion of the work for compressing the additional air is provided by work expansion of the byproduct stream from the air separation system. The byproduct stream can be heated prior to work expansion.

In one version of the invention, the compressed air feed stream can be provided by both the main compressed air stream and the supplemental compressed air stream during the entire time period of operation. In an alternative version of the invention, the compressed air feed stream can be provided completely by the main compressed air stream during a portion of the time period while the compressed air feed stream is provided by both the main compressed air stream during the remaining portion of the time period.

Optionally, a portion of the work for compressing the additional air is provided by an electric motor. The byproduct stream typically is at a pressure of at least 20 psia.

The air separation system can comprise a cryogenic air separation system. The work expansion of the byproduct stream from the cryogenic air separation system yields a cooled expanded byproduct stream which may be utilized for process cooling in the air separation system.

Alternatively, the air separation system can comprise a polymeric membrane air separation system, a pressure swing adsorption system, or an ion transport membrane system.

The compression of the additional air to yield the supplemental compressed air stream can be carried out in a rotating compressor and the work expansion of the byproduct stream can be carried out in a turboexpander, and in this mode of operation the rotating compressor and the turboexpander can be mechanically linked. In one mode, the compressor and turboexpander are directly linked and rotate at the same speed. In another mode, the compressor and turboexpander are linked by a gear drive and rotate at different speeds.

Optionally, at least a portion of the work generated by the work expansion of the byproduct stream from the air separation system can be utilized to drive a motor-generator. During a portion of the time period, the motor-generator can be operated as a motor to provide work for compressing the additional air. Alternatively during a portion of the time period, the motor-generator can be operated as a generator to generate electric power.

In an alternative embodiment, the invention is a method for the separation of air which comprises providing a compressed air feed stream by compressing air in a multiple-stage air compressor, separating the compressed air feed stream in an air separation system to yield at least one product stream enriched in a constituent of air and at least one byproduct stream depleted in that constituent, and work expanding the byproduct stream from the air separation system in a turboexpander. The resulting work from the turboexpander provides a portion of the work required to drive each stage of the multiple-stage air compressor.

Each stage of the multiple-stage centrifugal air compressor in this alternative embodiment can be mechanically linked to a rotating driver, and the work required to drive each stage of the multiple-stage centrifugal compressor can be provided in part by the rotating driver and in part by the turboexpander. The rotating driver can be mechanically linked to the turboexpander such that the rotating driver and the turboexpander rotate at different speeds. The common rotating driver can be an electric motor and the multiple-stage centrifugal air compressor can be an integral-gear compressor. If desired, the byproduct stream can be heated prior to work expansion.

BRIEF DESCRIPTION OF SEVERAL VIEWS OF THE DRAWINGS

FIG. 7 is a plot of the relative flow rates of the main and supplemental air streams as described in Example 1.

FIG. 8 is a plot of the relative flow rates of the main and supplemental air streams as described in Example 2.

DETAILED DESCRIPTION OF THE INVENTION

Figure 1:
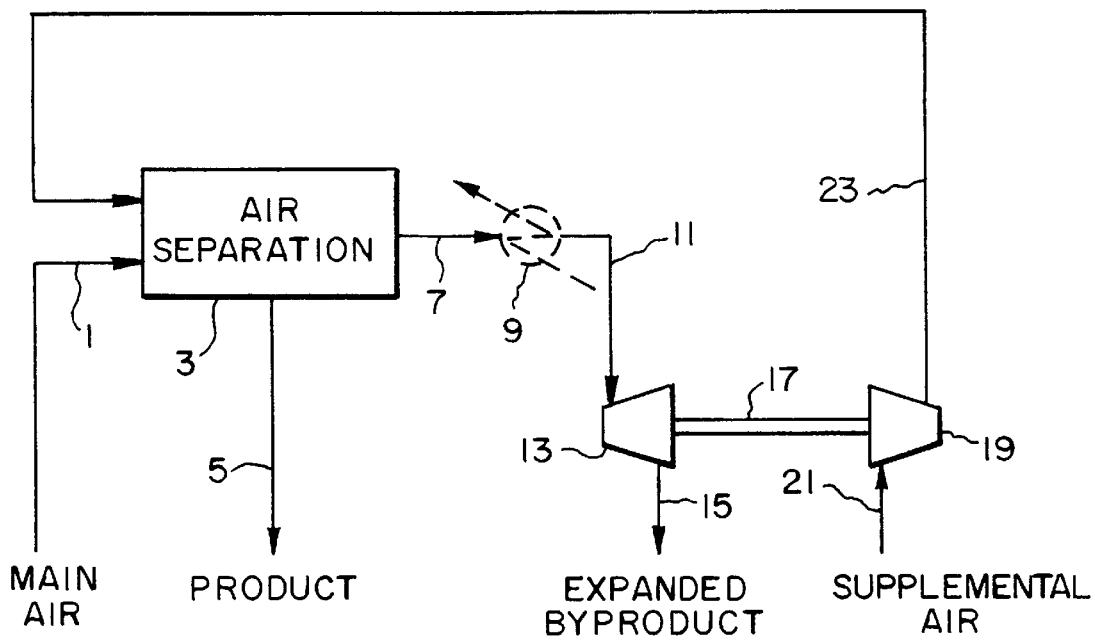
FIG. 1 is a schematic flow diagram of a first embodiment of the present invention.

The invention is a power-efficient method to supplement the compressed feed air to an air separation system by utilizing the residual pressure energy in byproduct streams from the system to compress additional air during selected periods of operation. Supplemental air can be provided during off-design periods when the main air supply falls below the required flow rate, or can be provided continuously to allow the use of a smaller main air supply system at reduced capital and operating cost. Byproduct gas is work expanded to drive a supplemental air compressor directly, or can drive the compressor thorough a gear drive system to allow different operating speeds of the compressor and expander.

Expandable gas streams often are available as byproducts of the air separation process and can be utilized in assisting air compression to the air separation unit (ASU). This invention includes process and operating methods utilizing expandable byproduct streams to reduce the capital investment and power consumption of the air compression equipment. Alternatively, the invention has the capability to increase the power supplied for air compression above normal operation for off-design occurrences such as:

- individual occurrences or combinations of high ambient air temperature, high ambient air relative humidity, low atmospheric air pressure, and high supply temperature of cooling fluids such as air or water;
- a shortfall in air supply to the ASU from an external source, such as air extracted from a gas turbine compressor;
- meeting demands for peak production;
- optimizing the ASU or overall process which incorporates the ASU; and
- generating electric power for internal consumption or export.

ASUs often are designed such that high pressure byproduct streams are available at essentially no cost. Recovery of the energy available in these streams may be utilized for a more efficient, cost effective, and highly flexible ASU.

Normally, the main air compressor of an ASU is designed for maximum efficiency at a particular air inlet temperature, discharge pressure, and flow rate. Often referred to as the "design" point, this combination of temperature and flow rate usually represents the conditions at which the motor-compressor system will operate for the greatest portion of time during the life of the facility. It also can represent an average of the most frequently required temperature and flow rate conditions. The design of the air compressor is set by maximizing the efficiency at the design point. The characteristics of the compressor design determine the operating limitations at off-design conditions such as higher inlet air temperatures.

On a hot day when the air temperature is above design, the mass flow through the main air compressor will be reduced because the maximum actual volume of air which can be processed by the compressor is fixed. The production rate of the ASU therefore is limited during these conditions. If there is a shortfall in air supplied from an external source (for example as extracted air from a gas turbine air compressor), the ASU production also will be reduced. If more air flow is needed for optimization or peak production above design, the ASU production rate cannot be met.

It is possible to equip the compressor with adjustable inlet guide vanes or a variable speed drive to accept a greater inlet volume, but the driver power would have to be increased and compressor efficiency would show a slight decrease during design operation. In addition to the cost increase and reduced efficiency of operation, guide vane and variable speed equipment enhancements may not be sufficient to overcome the shortfall in air supply for many air separation facilities. An example would be the operation of an air separation unit in a geographical area with highly variable electric power costs. Night and weekend operation at substantially higher production rates to take advantage of lower power costs would be limited by the motor-compressor air supply system. Another example is an air separation unit which obtains a portion of its air supply from a gas turbine used in an integrated gasification combined cycle facility. Since the gas turbine air compressor exhibits the same flow restriction characteristics with ambient conditions, air supply to the air separation unit would be drastically reduced during high air temperature operation. This shortfall, combined with the air compressor shortfall, would dramatically reduce the ASU production rate.

Another aspect of compression equipment typically used in an air separation processes is the "frame size" or modular nature of the equipment. A frame size refers to a combination of essentially fixed-size components which represents a compression equipment package of essentially fixed price. This package is supplied for "design" flows which can vary by as much as 40%. The design flow variability is accommodated by changing the design of the compressor wheels or stages, which represent a small percentage of the price of the compressor frame. As a result, the capital cost component of the specific cost ($/air mass flow) for air compression can vary substantially depending on where the design air flow falls within the compressor frame capacity. For air flows at the low flow end of the frame size, the cost obviously will be increased. For some ASUs, the present invention would be particularly useful when proper utilization of an expandable gas stream could decrease the design air flow of the main air compressor, allowing selection of a smaller frame size. These problems associated with air compression are addressed by embodiments of the present invention.

The invention is a method to augment the supply of pressurized air to any type of air separation unit by utilizing the energy contained in pressurized byproduct streams generated as a result of the air separation process. In the operation of an elevated pressure air separation process, high pressure byproduct streams often are produced which have little or no economic value. The venting of these streams to the atmosphere represents a lost work component which decreases the overall efficiency and increases the cost of the air separation process. Examples of these types of pressurized byproduct streams include:

nitrogen-enriched byproduct streams obtained from the high pressure column of a cryogenic air separation process;

nitrogen- or oxygen-enriched streams obtained from medium or low pressure columns of a cryogenic air separation process operating at pressures above about 20 psia;

non-adsorbed nitrogen- or oxygen-enriched byproduct streams from a pressure swing adsorption (PSA) air separation process;

non-permeable nitrogen-enriched byproduct streams from a polymeric membrane-based air separation process; and the nitrogen-enriched non-permeate byproduct stream obtained from an ionic transport membrane-based air separation process.

The invention economically and efficiently recovers energy contained in these streams by work expansion of the high-pressure fluid and applies this energy to ASU feed air compression. The expander which is used to recover energy from the high-pressure stream is connected directly or through a gearbox to compression equipment which provides a supplemental flow of air to the ASU, or alternatively, is connected directly to a main air supply compressor. When a supplemental air flow is provided, the flow rate required from the main source of air to the ASU can be reduced. This application would be particularly useful when cost savings can be realized by reducing the main air compressor by one frame size due to a reduced flow rate requirement. Depending on the temperature at the expander outlet, the expanded stream may be vented to the atmosphere.

Alternatively, the expanded stream (which has been cooled by work expansion) may be used to provide chilled water for ASU air or product compressor intercoolers and aftercoolers, for other equipment associated with the ASU, for other equipment associated with the facility which is served by the ASU, or for export. Chilled water is produced by contacting the cooled, expanded stream with water in a tower filled with packing, trays or other contacting devices. Alternatively, the expanded stream may be used for regenerating air purification equipment used in many ASUs. The expanded byproduct stream may be split into two or more portions to provide both chilled water and regeneration gas.

In another general embodiment of the invention, the fluid to be expanded may be heated prior to expansion to increase the power recovered during the expansion process. Heating may be constant or applied as necessary to vary the power recovery depending on the overall needs of the ASU. Heat sources include, but are not limited to, steam, heat of compression, heat recovered from process streams, or fuel firing by direct or indirect means to raise the temperature of the byproduct stream before expansion. The outlet temperature of the expanded stream may be controlled by the degree of pressure reduction through the expander or by control of the inlet temperature. An above-ambient discharge temperature from the expander would be useful if the expanded stream were to be used for regeneration of an ASU air pretreatment system employing a thermal swing, pressure swing, or combination pressure/thermal swing adsorption unit.

Alternatively, the high pressure byproduct stream could be used at pressure for regeneration of the air pretreatment system prior to expansion. The mass flow rate of the stream would be increased by desorbed contaminants (water and carbon dioxide) recovered from the air pretreatment system, thus increasing expander work production. Constant or variable heating of the byproduct stream prior to and/or after entering the air pretreatment system could be employed to optimize operation of the system.

In another general embodiment of the invention, a supplemental driver would be connected to the expander-air compressor unit to allow additional supplemental air flow to be provided. The driver would normally be an electric motor; however, a steam or gas turbine or other suitable means of providing energy including other expansion devices could be employed. Various means of mechanically connecting the expander, supplemental air compressor and supplemental driver would be employed depending on the operating characteristics of each unit. Means for mechanically coupling these units include direct drives, integral-gear systems to increase or decrease speeds of individual units, and clutches to disconnect one or more of the units from the overall system.

In a specific embodiment of the invention, the supplemental air compressor is of the type known as an integral-gear centrifugal compressor. A characteristic of integral-gear units is the arrangement of pinions carrying one or two compressor bodies or stages. Multiple pinions can be mounted on a single bullgear to make up the integral-gear unit. The bullgear is typically driven by a motor or any power input device. Pinion speeds are selected to optimize the efficiency of the compressor stages mounted on each pinion. A particularly useful embodiment of the invention is to drive the integral-gear, supplemental air compressor with the high pressure byproduct expansion device. The expansion device could drive the central bullgear or be mounted on a pinion connected to the bullgear. Additional power for the supplemental air compressor could be provided by an extra drive device connected to the bullgear or to a pinion.

In another specific embodiment of the invention, control of the inlet temperature or expansion ratio of the byproduct expansion device and/or providing an additional driver to provide variable amounts of supplemental air would be particularly useful for increasing the supplemental air flow to the ASU. Increased supplemental air flow could offset decreases in main air supply due to adverse ambient conditions, decreased supply from an outside source, degradation over time of the main air source, outages of main air sources, or other circumstances resulting in decreased main air supply to the ASU. Increased supplemental air flow also could be used to increase ASU production to meet peak shaving or other demands for increased production.

In another specific embodiment of the invention, the byproduct expansion device and an additional driver can provide the energy required to compress all the air feed to the ASU process.

The embodiments of the invention discussed above refer to the use of a single high pressure byproduct stream. In actual practice, multiple byproduct streams at the same or different pressures may be available from the ASU process. Multiple streams may be combined or expanded individually as previously described to optimize system operation. It may also be advantageous to use multiple supplemental air compression, byproduct expansion, and supplemental drive devices depending on the specific nature and size of the ASU process. Multiple levels of heating the byproduct streams before expansion may also be useful in optimizing the system. The foregoing embodiments of the invention also refer to typical machinery configurations. The application of other devices and configurations can be utilized, and the invention is not limited to the specific process applications described herein.

The first embodiment of the invention utilizing a single turboexpander-compressor unit is illustrated in FIG. 1. Main air feed 1 is the main source of air for air separation unit (ASU) 3 and may be supplied at a pressure above atmospheric from an external source and further compressed by a main air compressor (not shown) within ASU 3. Alternatively, main air feed 1 can be atmospheric air which is compressed by a main air compressor (not shown) within ASU 3. Supplemental air feed 23 is introduced into ASU 3 and is processed therein with main air feed 1. Principal product stream 5, enriched in one of the constituents of air, is withdrawn from the system. Pressurized byproduct stream 7 at a pressure typically greater than about 20 psia is withdrawn from ASU 3 as a single byproduct stream or as a combined stream of two or more different byproduct streams. Other product or byproduct streams which are pertinent to the present invention may produced, depending upon the design and operating characteristics of ASU 3. Pressurized byproduct stream 7 optionally may be heated in heat exchange zone 9 before work expansion.

Expanded byproduct stream 15 is discharged from turboexpander 13 at a pressure close to atmospheric and at a temperature of −50 to +300° F. This cool low-pressure stream may be utilized further in ASU 3 to generate refrigeration or used to regenerate adsorption beds (not shown) in the ASU air pretreatment system. Turboexpander 13 is mechanically linked to supplemental air compressor 19 by shaft 17. Air stream 21, at or above atmospheric pressure, enters supplemental air compressor 19 and is increased in pressure to yield supplemental air stream 23. The operating air pressure of ASU 3, typically set by main air stream 1, may be selected to provide byproduct stream conditions that produce an optimum constant flow rate of supplemental air stream 23 to the ASU. The pressures of air streams 1 and 23 generally are in the range of 60 to 450 psia, and the pressures may or may not be identical depending on the nature of the ASU process cycle. Turboexpander 13 and/or compressor 19 can be multiple-stage machines as required.

The molar flow of supplemental air stream 23 should be selected to yield an optimum flow rate of main air stream 1 to optimize the size and cost of the main air compression system. This compression system can be upstream (if main air stream 1 is obtained from an external source such as a gas turbine compressor) or can be located within ASU 3. An optional method of operation would be to operate the overall system such that the mass flow rate of byproduct stream 7 is normally less than its maximum flow rate, and/or that the temperature of heated byproduct stream 11 is at a temperature less than the maximum operating temperature provided by heat exchange zone 9. When an increase in demand for ASU product stream 5 or a decrease in the flow rate of main air stream 1 is encountered, the flow rate of byproduct stream 7 would be increased to its maximum flow rate and/or the temperature of heated byproduct stream 11 would be increased in heat exchange zone 9 to overcome the shortfall in air supply to ASU 3. Supplemental air compressor 19 could be equipped with adjustable inlet guide vanes to vary mass throughput while maintaining a constant discharge pressure.

Figure 2:
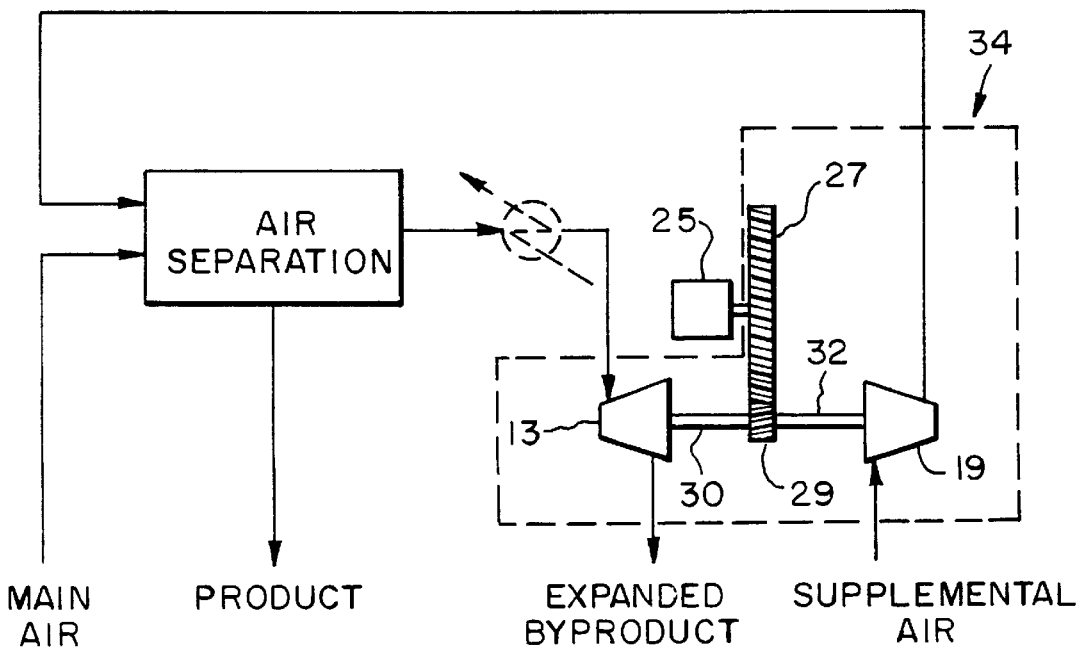
FIG. 2 is a schematic flow diagram of a second embodiment of the present invention.

An alternative embodiment of the invention is shown in FIG. 2 wherein the work generated by turboexpander 13 is supplemented by driver 25 connected directly to bullgear 27 which engages pinion 29. Pinion 29 is driven in part via shaft 30 connected to turboexpander 13, and pinion 29 drives supplemental air compressor 19 via shaft 32. If desired, turboexpander 13, air compressor 19, bullgear 27, shafts 30 and 32, and pinion 29 can be combined mechanically in integral-gear compressor-expander unit 34. Driver 25 can be an electric motor, steam turbine, or gas turbine. Alternatively, driver 25 can drive a pinion (not shown) which in turn drives bullgear 27.

An integral gear compressor-expander is a dynamic gas compression and expansion device with one or more stages of centrifugal and/or axial impellers in which at least a portion of the gearing for speed adjustment between the rotational speed of the driver and the rotational speed of the wheels of each impeller stage is located between the stage wheels and a flexible shaft coupling for power input. Thus the speed adjustment gearing is integral to the compressor and expander side of the equipment partition as defined by the power input flexible shaft coupling, rather than housed in a free standing gearbox or incorporated in the driver.

Figure 3:
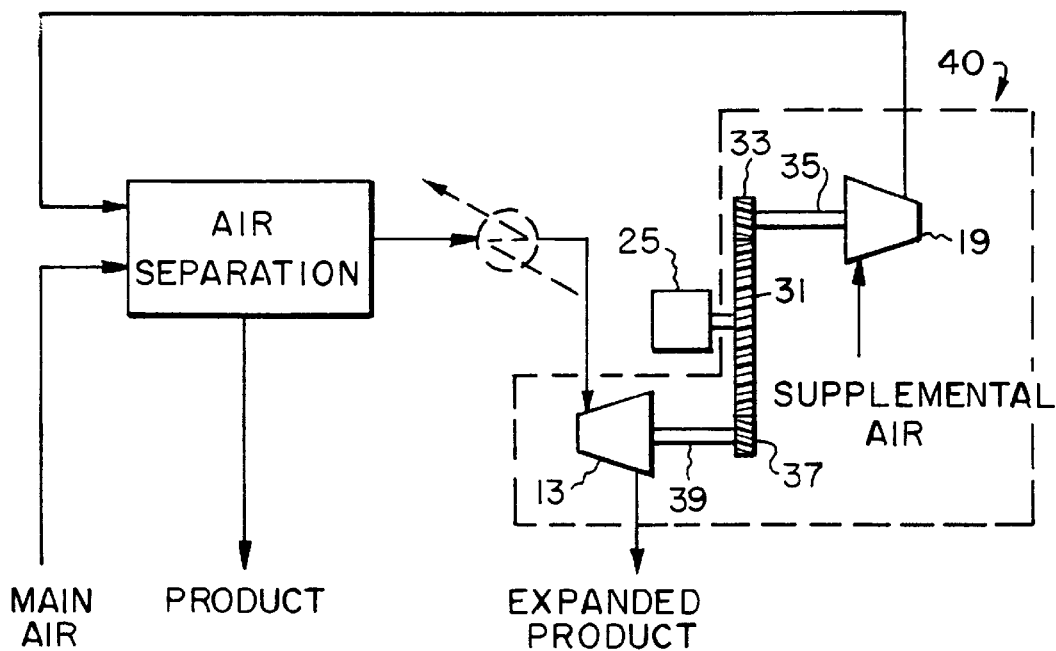
FIG. 3 is a schematic flow diagram of a third embodiment of the present invention.

Another alternative embodiment of the invention is illustrated in FIG. 3 wherein driver 25 is directly connected to bullgear 31, which in turn drives pinion 33 connected via shaft 35 to compressor 19. Bullgear 31 also drives pinion 37 which is connected by shaft 39 to turboexpander 13. This arrangement allows turboexpander 13, compressor 19, and driver 25 to operate at different rotational speeds. If desired, turboexpander 13, air compressor 19, bullgear 31, pinions 33 and 37, and shafts 35 and 39 can be combined mechanically in integral-gear compressor-expander unit 40. Alternatively, driver 25 can drive a pinion (not shown) which in turn drives bullgear 27.

Figure 4:
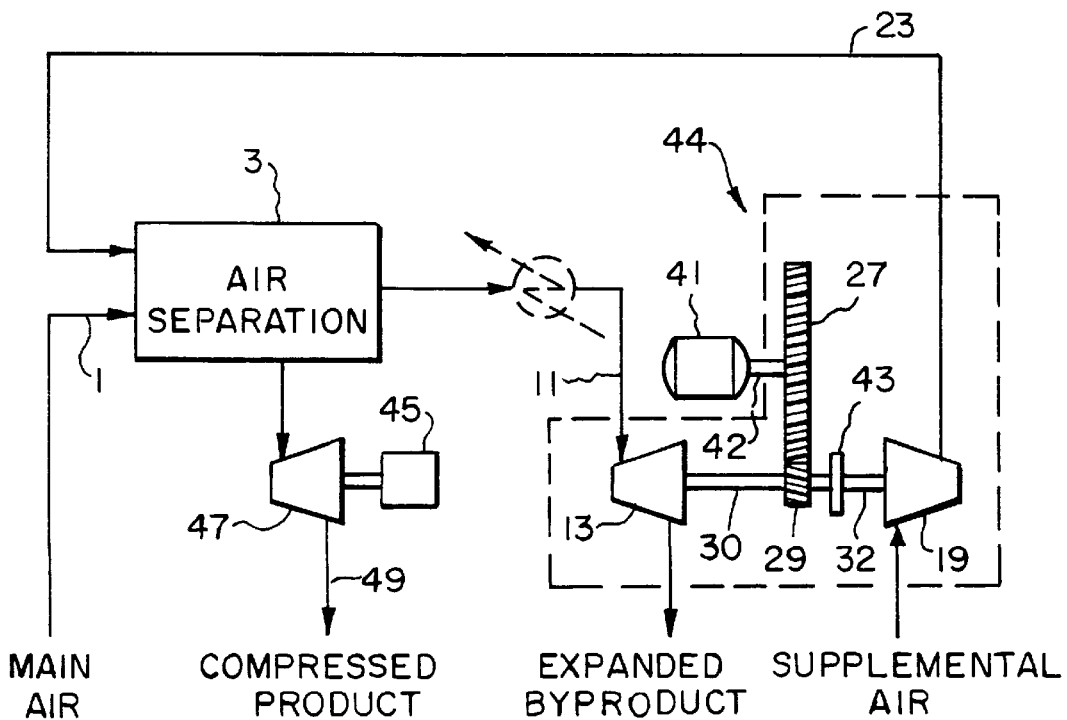
FIG. 4 is a schematic flow diagram of a fourth embodiment of the present invention.

A further alternative embodiment is shown in FIG. 4 which is a modification of the system of FIG. 2. Turboexpander 13 drives bullgear 27 via pinion 29 and shaft 30, and bullgear 27 is mechanically connected to motor-generator 41 by shaft 42. Compressor 19 can be connected to pinion 29 via shaft 32 and clutch 43. Alternatively (not shown), clutch 43 can be installed on an extension of shaft 42 through bullgear 27, and the clutch connected to an additional bullgear which drives a pinion connected to compressor 19. In this alternative, bullgear 27 and the additional bullgear rotate at the same speed.

When a higher flow rate of supplemental air stream 23 is required by air separation system 3, clutch 43 is engaged according to either of the alternatives discussed above and motor-generator 41 operates as an electric motor to supplement the work generated by turboexpander 13 to drive compressor 19. When a lower flow rate of supplemental air stream 23 is required by air separation system 3, clutch 43 remains engaged but motor-generator 41 operates as a generator, and all work of compression is provided by a portion of the work generated by turboexpander 13. If no supplemental air stream 23 is required by air separation system 3, clutch 43 is disengaged, motor-generator 41 continues to operate as a generator, and all work generated by turboexpander 13 is converted to electric power by motor-generator 41. This electric power can be used for example to provide some or all of the power to drive motor 45 and product compressor 47 to provide compressed product stream 49. In the embodiment of FIG. 4, turboexpander 13, air compressor 19, bullgear 27, shafts 30, 32, and 42, pinion 29, and clutch 43 can be combined mechanically if desired in integral-gear compressor-expander unit 44.

Figure 5:
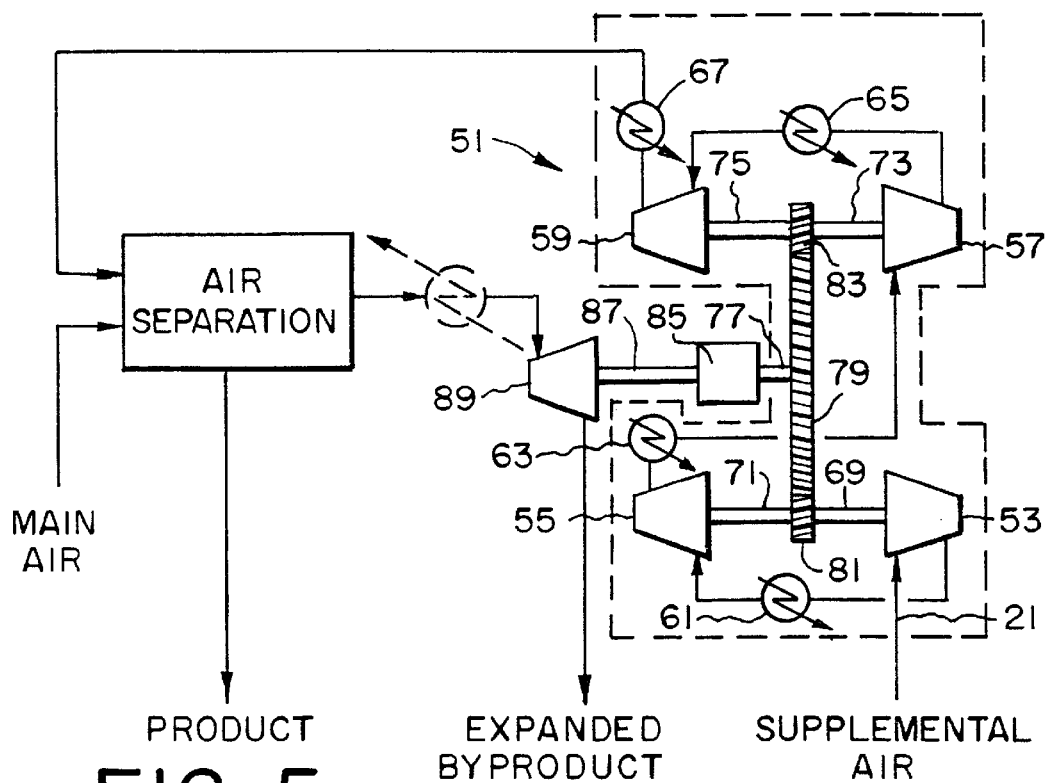
FIG. 5 is a schematic flow diagram of a fifth embodiment of the present invention.

FIG. 5 presents a specialized variation of the embodiment of FIG. 2. In this variation, supplemental air 21 is compressed in four-stage intercooled integral-gear compressor unit 51 which comprises compressor stages 53, 55, 57, and 59; intercoolers 61, 63, 65, and 67; shafts 69, 71, 73, 75, and 77; bullgear 79; and pinions 81 and 83. Driver 85 drives bullgear 79 via shaft 77, and driver 85 is connected via shaft 87 to byproduct turboexpander 89. Alternatively, driver 85 may be connected to byproduct turboexpander 89 via shaft 87 and a gear reduction unit (not shown) such that driver 85 and byproduct turboexpander 89 rotate at different speeds.

The work for compressing supplemental air 21 thus is provided in combination by driver 85 and turboexpander 89. Driver 85 can be an electric motor, steam turbine, or gas turbine. If the flow of supplemental air 21 is below a certain level, the work of compression can be provided in total by turboexpander 89 and driver 85 would not be needed. An integral gear compressor as illustrated in FIG. 5 can be defined as a dynamic gas compression device with one or more stages of centrifugal and/or axial impellers in which at least a portion of the gearing for speed adjustment between the rotational speed of the driver and the rotational speed of the wheels of each impeller stage is located between the stage wheels and a flexible shaft coupling for power input. Thus the speed adjustment gearing is integral to the compressor side of the equipment partition defined by the power input flexible shaft coupling, rather than housed in a free standing gearbox or incorporated in the driver.

Figure 6:
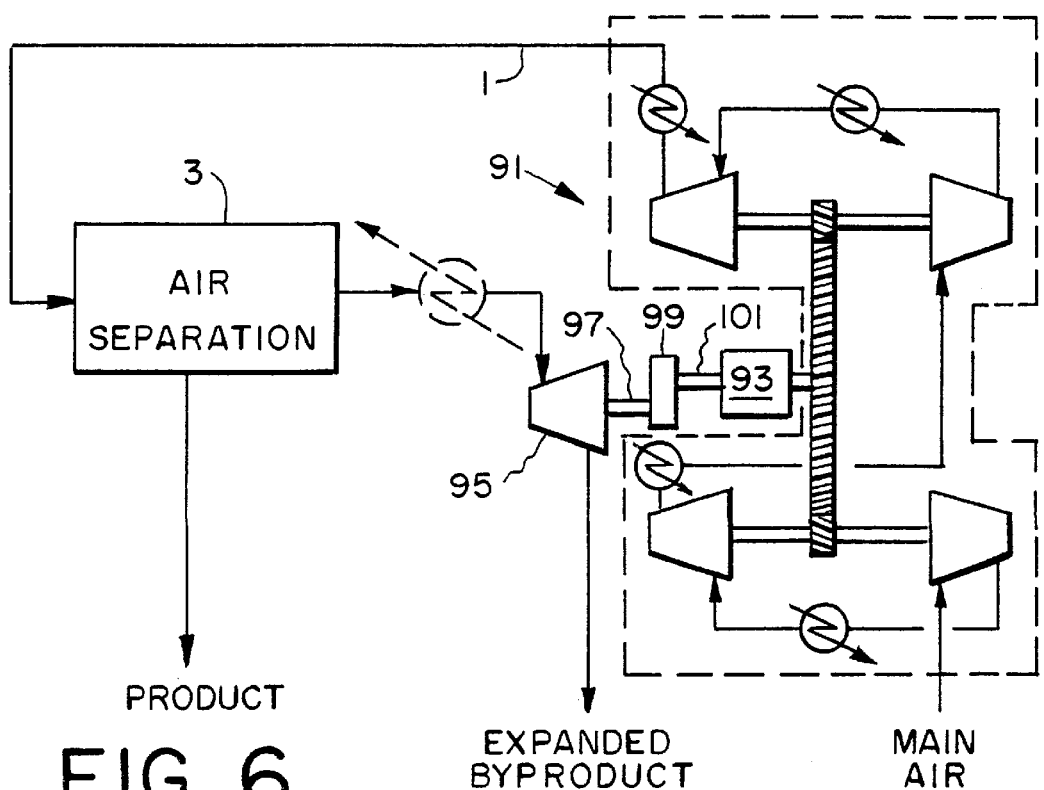
FIG. 6 is a schematic flow diagram of an alternative embodiment of the present invention.

A separate but related embodiment of the invention is illustrated in FIG. 6. In this related embodiment, main air 1 to air separation unit 3 is provided by compression in four-stage intercooled integral-gear compressor unit 91, which can be identical to, but has a larger flow capacity than, integral-gear compressor unit 51 of FIG. 5. There is no supplemental air provided in this embodiment. Integral-gear compressor unit 91 is driven by a combination of driver 93 and byproduct turboexpander 95. This is accomplished via shaft 97, gear reduction unit 99, and shaft 101 such that driver 93 and byproduct turboexpander 95 operate at different rotational speeds. Turboexpander 95 is not integrated directly with integral-gear compressor unit 91, and operates independently by transmitting the work of expansion through gear reduction unit 99.

The invention as described in the various embodiments of FIGS. 1 through 5 can be operated in one of two different modes as earlier described. In the first mode, supplemental air is provided only when the main air supply to the ASU is insufficient due to increased product demand, adverse ambient air conditions, or both. In this first mode, the supplemental air supply system is operated intermittently. In the second mode, the air compressor for the main air supply to the ASU is undersized to allow the use of a smaller compressor frame size or for other cost-related reasons. The additional feed air is supplied continuously by the supplemental air supply compressor which is driven at least in part by work expansion of the ASU byproduct stream. These two modes of operation are illustrated by the following Examples.

EXAMPLE 1

An air separation system is designed and operated to supply a 99 mole % oxygen product to an oxygen-consuming process. The oxygen product demand, air feed rate, and ambient air temperature vary over a 24-hour period as summarized in Table 1.

TABLE 1

Variation in Oxygen Product Demand and Ambient Air Temperature for Example 1.

| Clock Time | Oxygen Rate, Std. Tons/Day | Air Temperature, Deg. F. | Total Required Air Flow to ASU | |
|---|---|---|---|---|
| | | | Inlet ACFM × $10^{-3}$ | lb/hr × $10^{-3}$ |
| Midnight | 1500 | 70 | 126.9 | 561.7 |
| 6:00 a.m. | 1600 | 70 | 135.4 | 599.1 |
| 8:00 a.m. | 1800 | 75 | 154.1 | 675.0 |
| 10:00 a.m. | 1600 | 80 | 139.2 | 602.6 |
| Noon | 2000 | 90 | 178.0 | 755.2 |
| 4:00 p.m. | 2000 | 85 | 175.7 | 753.2 |
| 6:00 p.m. | 1800 | 80 | 156.1 | 676.4 |
| 8:00 p.m. | 1600 | 75 | 137.5 | 601.2 |
| 10:00 p.m. | 1500 | 70 | 126.9 | 561.7 |
| Midnight | 1500 | 70 | 126.9 | 561.7 |

The main feed air for the ASU (e.g. stream 1 of FIG. 1) is obtained from an outside source which normally provides 600,000 lb/hr of air. During certain periods, as indicated in Table 1, this is an insufficient amount of air, and the remaining air is provided by supplemental air (e.g. stream 23 of FIG. 1) which is compressed using the work of expansion of the ASU byproduct stream (e.g. stream 7 of FIG. 1).

A plot of relative air flow vs time is given in FIG. 7 to illustrate the relative amounts of air provided by the main air supply and the supplemental air supply. The time is indicated in hours where zero hours represents midnight in Table 1. FIG. 7 shows that the main air supply is sufficient to supply 100% of the required air during the periods of 0 to 6 hours and 20 to 24 hours; during the remaining periods, supplemental air is supplied to provide the required air feed to the ASU.

EXAMPLE 2

The main feed air for the ASU, stream 1 of FIG. 1, is obtained from an outside source (such as the gas turbine compressor of an IGCC system) which normally provides a maximum of 100,000 CFM of air as measured at the actual compressor inlet conditions. The oxygen product demand, air feed rate, and ambient air temperature vary over a 24-hour period as summarized in Table 1. The compressor providing this main air feed is deliberately undersized for cost optimization as earlier described. This undersized compressor provides an insufficient amount of air for the ASU during all periods indicated in Table 1, and the remaining air is provided continuously by supplemental air (e.g. stream 23 of FIG. 1) which is compressed using the work of expansion of the ASU byproduct stream (e.g. stream 7 of FIG. 1).

A plot of relative air flow vs time is given in FIG. 8 to illustrate the relative amounts of air provided by the main air supply and the supplemental air supply. The time is indicated in hours where zero hours represents midnight in Table 1. FIG. 8 shows that the main air supply provides only a portion of the required air during the entire operating period, and supplemental air is supplied continuously to provide the required air feed to the ASU.

EXAMPLE 3

The system of FIG. 4 is operated at design conditions which include an ambient air temperature of 59° F. and a compressed oxygen product stream 49 flow rate of 2000 std ton/day at a pressure of 600 psia. Main air stream 1 provides 90% of the air feed required by ASU 3 at 195 psia and supplemental air 23 provides the remaining 10% of the air feed at the same pressure. Byproduct nitrogen 11 at 53 psia and 260° F. is expanded in turboexpander 13 and the work generated from this byproduct expansion drives supplemental air compressor 19 and motor-generator 41 operating as a generator. Motor 45 driving oxygen product compressor 47 draws 6400 kW of electric power, of which 3200 kW is provided by motor-generator 41 and 3200 kW is provided from an external source.

As a result of increased product demand and an increase in the ambient air temperature to 90° F., main air stream 1 provides only 80% of the air feed required by ASU 3 at 195 psia. Supplemental air 23 then provides the remaining 20% of the air feed at the same pressure. At these operating conditions, the total work of expansion of turboexpander 13 is utilized to drive supplemental air compressor 19, and motor-generator 41 generates no excess power. As a result, the total 6400 kW of electric power required by motor 45 to drive oxygen product compressor 47 must be imported from an external source.

Thus the objective of the present invention is to increase the overall power efficiency and improve the flexibility of an air separation process during both normal and off-design operating periods. This is accomplished by providing means to increase the overall power efficiency of feed air compression, to supply the necessary volume of product under variable operating conditions, and to utilize byproduct streams in an effective manner to achieve these objectives. The invention has potential utility in any air separation process which requires feed air compression, including pressure swing adsorption, chemical absorption, cryogenic distillation, permeation by polymeric membranes, and diffusion through solid ceramic ion transport membranes.

As pointed out earlier, feed air compression is one of the largest components of both the capital and operating costs of air separation, and any reduction in the feed air compression cost translates into an important reduction in the cost of the product(s) from the air separation system. The design of an air compression system for an air separation plant is complex because the design must address changes in ambient air temperature, pressure, and humidity which reduce the capacity or efficiency of air compression equipment. In addition, the design often must account for fluctuating product demand which may occur independently of, or simultaneously with, changes in ambient air conditions. The present invention enables the utilization of byproduct streams in an energy-efficient manner to reduce the power consumption of feed air compression and to improve the overall flexibility of an air separation process during both normal and off-design operating periods.

The essential characteristics of the present invention are described completely in the foregoing disclosure. One skilled in the art can understand the invention and make various modifications without departing from the basic spirit of the invention, and without deviating from the scope and equivalents of the claims which follow.

What is claimed is:

1. A method for the separation of air which comprises:
  (a) providing a compressed air feed stream;
  (b) separating the compressed air feed stream in an air separation system to yield at least one product stream enriched in a constituent of air and at least one byproduct stream depleted in that constituent; and
  (c) operating the air separation system during a time period by
    (c1) providing at least a portion of the compressed air feed stream by a main compressed air stream and
    (c2) during at least part of the time period, compressing additional air to yield a supplemental compressed air stream which provides a portion of the compressed air feed stream, wherein at least a portion of the work for compressing the additional air is provided by work expansion of the byproduct stream from the air separation system.

2. The method of claim 1 wherein the byproduct stream is heated prior to work expansion.

3. The method of claim 1 wherein during the entire time period of (c) the compressed air feed stream is provided by both the main compressed air stream and the supplemental compressed air stream.

4. The method of claim 1 wherein during a portion of the time period of (c) the compressed air feed stream is provided completely by the main compressed air stream and during the remaining portion of the time period the compressed air feed stream is provided by both the main compressed air stream and the supplemental compressed air stream.

5. The method of claim 1 wherein a portion of the work for compressing the additional air is provided by an electric motor.

6. The method of claim 1 wherein the byproduct stream is at a pressure of at least 20 psia.

7. The method of claim 1 wherein the air separation system comprises a cryogenic air separation system.

8. The method of claim 7 wherein the work expansion of the byproduct stream from the cryogenic air separation system yields a cooled expanded byproduct stream which is utilized for process cooling in the air separation system.

9. The method of claim 1 wherein the air separation system comprises a polymeric membrane air separation system.

10. The method of claim 1 wherein the air separation system comprises a pressure swing adsorption system.

11. The method of claim 1 wherein the air separation system comprises an ion transport membrane system.

12. The method of claim 1 wherein compression of the additional air to yield the supplemental compressed air stream is carried out in a rotating compressor and the work expansion of the byproduct stream is carried out in a turboexpander, and wherein the rotating compressor and the turboexpander are mechanically linked.

13. The method of claim 12 wherein the compressor and turboexpander are directly linked and rotate at the same speed.

14. The method of claim 12 wherein the compressor and turboexpander are linked by a gear drive and rotate at different speeds.

15. The method of claim 1 wherein at least a portion of the work generated by the work expansion of the byproduct stream from the air separation system is utilized to drive a motor-generator.

16. The method of claim 15 wherein the motor-generator is operated during a portion of the time period as a motor to provide work for compressing the additional air.

17. The method of claim 15 wherein the motor-generator is operated during a portion of the time period as a generator to generate electric power.

18. A method for the separation of air which comprises:
  (a) providing a compressed air feed stream by compressing air in a multiple-stage centrifugal air compressor;
  (b) separating the compressed air feed stream in an air separation system to yield at least one product stream enriched in a constituent of air and at least one byproduct stream depleted in that constituent; and
  (c) work expanding the byproduct stream from the air separation system in a turboexpander and utilizing the resulting work to provide a portion of the work required to drive each stage of the multiple-stage air compressor;

wherein each stage of the multiple-stage centrifugal air compressor is mechanically linked to a rotating driver; wherein the work required to drive each stage of the multiple-stage centrifugal compressor is provided in part by the rotating driver and in part by the turboexpander; and wherein the rotating driver is mechanically linked to the turboexpander such that the rotating driver and the turboexpander rotate at different speeds.

19. The method of claim 18 wherein the common rotating driver is an electric motor.

20. The method of claim 19 wherein the multiple-stage centrifugal air compressor is an integral-gear compressor.

21. The method of claim 19 wherein the byproduct stream is heated prior to work expansion.

* * * * *